US00RE42286E

(19) United States
(12) Reissued Patent
Chen et al.

(10) Patent Number: US RE42,286 E
(45) Date of Reissued Patent: Apr. 12, 2011

(54) IMAGE DATA PROCESSING SYSTEM

(75) Inventors: Kuei-Hsiang Chen, Xinhua Town (TW); Cheng-Pang Chien, Hsin-Chu (TW); Tian-Quey Lee, Hsinchu (TW)

(73) Assignee: Transpacific Optics LLC, Wilmington, DE (US)

(21) Appl. No.: 11/450,949

(22) Filed: Jun. 8, 2006

Related U.S. Patent Documents

Reissue of:
(64) Patent No.: 6,747,637
Issued: Jun. 8, 2004
Appl. No.: 09/819,750
Filed: Mar. 29, 2001

(30) Foreign Application Priority Data

Jan. 9, 2000 (TW) ..... 89117914 A

(51) Int. Cl.
*G09G 5/00* (2006.01)

(52) U.S. Cl. ..... 345/204; 345/545; 345/100; 345/593; 345/600; 345/670; 345/671; 345/672; 345/673

(58) Field of Classification Search ..... 345/100, 345/113, 153, 155, 199, 204, 467, 545, 549, 345/550, 589, 593, 600–673, FOR. 163, FOR. 189
See application file for complete search history.

(56) References Cited

U.S. PATENT DOCUMENTS

| | | | | |
|---|---|---|---|---|
| 5,319,447 A | * | 6/1994 | Garino et al. | 348/708 |
| 5,581,280 A | | 12/1996 | Reinert et al. | |
| 5,633,661 A | * | 5/1997 | Morse | 345/549 |
| 6,232,955 B1 | | 5/2001 | Guttag et al. | |
| 6,356,314 B1 | * | 3/2002 | Takebe | 348/564 |
| 6,597,373 B1 | * | 7/2003 | Singla et al. | 345/698 |
| 6,747,637 B2 | | 6/2004 | Chen et al. | |

* cited by examiner

*Primary Examiner*—Quan-Zhen Wang
*Assistant Examiner*—Tom V Sheng
(74) *Attorney, Agent, or Firm*—Perkins Coie LLP

(57) ABSTRACT

The present invention provides an image data processing system to increase the speed of on-screen display (OSD) image processing. The image data processing system comprises M color code registers for storing a plurality of color codes and a first multiplexer electrically connected to every output port of the M color code registers. The first multiplexer comprises a control port for inputting an N-bit image code, and the first multiplexer chooses one of the outputs of the M color code registers as its output according to the N-bit image code. The image data processing system comprises a processor for storing M color codes in the M color code registers and periodically transmitting a plurality of N-bit image codes to the control port of the first multiplexer so that the first multiplexer periodically chooses one of the color codes stored in the M color code registers as its output according to one of the N-bit image codes.

23 Claims, 3 Drawing Sheets

IMAGE DATA PROCESSING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image data processing system, and more particularly, to an image data processing system with an increased processing speed.

2. Description of the Prior Art

Image data processing systems are used in the presentation of an on screen display (OSD) on a display so that a user can adjust the height, width, luminosity, and position of the display.

Please refer to FIG. 1. FIG. 1 is a function block diagram of a prior art image data processing system 10. The image data processing system 10 comprises a processor 12, an image memory 14, an X-axis address code register 16, a Y-axis address code register 18, an image width code register 20, an image height code register 22, an address controller 26, a display controller 28, and a display 30.

In the image data processing system 10, the processor 12 will store the X-axis position of the first pixel of the on screen display into the X-axis address code register 16, the Y-axis position of the first pixel of the on screen display into the Y-axis address code register 18, the width of the on screen display into the image width code register 20, and the height of the on screen display into the image height code register 22. The processor 12 uses the address controller 26 to store 16-bit color codes for each pixel of the on screen display into the image memory 14. The address controller 26 stores each color code output from the processor 12 into a predetermined address of the image memory 14 according to the information from the X-axis address code register 16, the Y-axis address code register 18, the image width code register 20, and the image height code register 22.

A multiplexer 24 comprises two input ports 32, 34 and an output port 36. The two input ports 32, 34 are electrically connected to an output port 38 of the image memory 14 and an external image input port 40. The output port 36 of the multiplexer 24 is electrically connected to an input port 42 of the display 30. The external image input port 40 is used to input an external image so that the display 30 will display an image from an external device (not shown), and the display controller 28 can control the on screen display via the multiplexer 24 so that both the on screen display and the external image overlap when shown on the display 30.

Please refer to FIG. 2. FIG. 2 is a layout map showing the relation between the display 30 and the image memory 14. A plurality of color codes is stored in the image memory 14, and these color codes can be thought of as arrayed in a matrix. The pixels of the display 30 are also arrayed as a matrix. The color codes in the image memory 14 map onto the pixels in the display 30. For example, the image memory 14 is a 16-megabit synchronous dynamic random access memory (16 M-bit SDRAM), and the display 30 has an SVGA resolution (800×600), as the shown in FIG. 2. Each horizontal line of the display 30 has 800 pixels, which maps to four rows in the SDRAM 14 as each row has 256 storage cells. For example, the (X, Y) coordinates (0, 0), (256, 0), (512, 0), (768, 0), (0, 1), and (256, 1) of the display 30 map to the SDRAM (Row, Col) addresses (0, 0), (1, 0), (2, 0), (3, 0), (4, 0), and (5, 0), respectively. Because the four rows of the synchronous dynamic random access memory 14 have a total of 1024 storage cells, the resolution of the display 30 can be raised to an XGA resolution of 1024×768.

Since the image data processing system 10 has only one kind of drawing mode, it will handle each pixel of the on screen display separately. The image data processing speed is thus very slow, and the image data is quite big.

SUMMARY OF THE INVENTION

It is therefore a primary objective of the present invention to provide an image data processing system that has many kinds of drawing modes. This can increase the image data processing speed and decrease the amount of image data to solve the above mentioned problems.

In a preferred embodiment, the present invention provides an image data processing system. The image data processing system has M color code registers for storing a plurality of color codes, a first multiplexer electrically connected to every output port of the M color code registers, and a processor for storing M color codes in the M color code registers. The first multiplexer has a control port for inputting an N-bit image code. The first multiplexer chooses one of the outputs of the M color code registers as its output according to the N-bit image code. The processor periodically transmits a plurality of N-bit image codes to the control port of the first multiplexer so that the first multiplexer periodically chooses one of the color codes stored in the M color code registers as its output according to one of the N-bit image codes.

It is an advantage of the present invention that the image data processing system has different kinds of drawing modes, which increases the image data processing speed and decreases the amount of image data.

These and other objective and advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
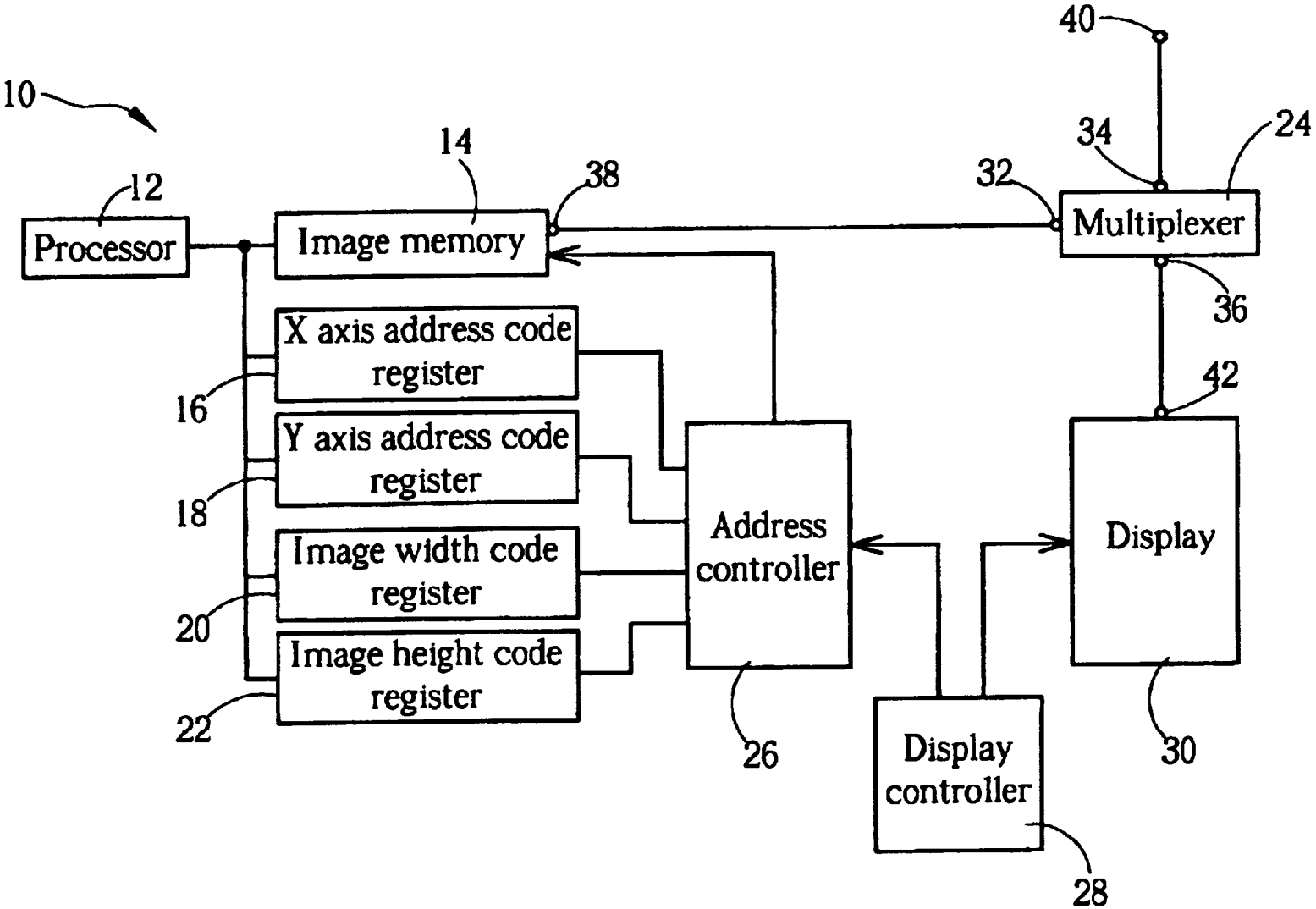
Fig. 1 Prior art
FIG. 1 is a diagram of a prior art image data processing system.
Figure 2:
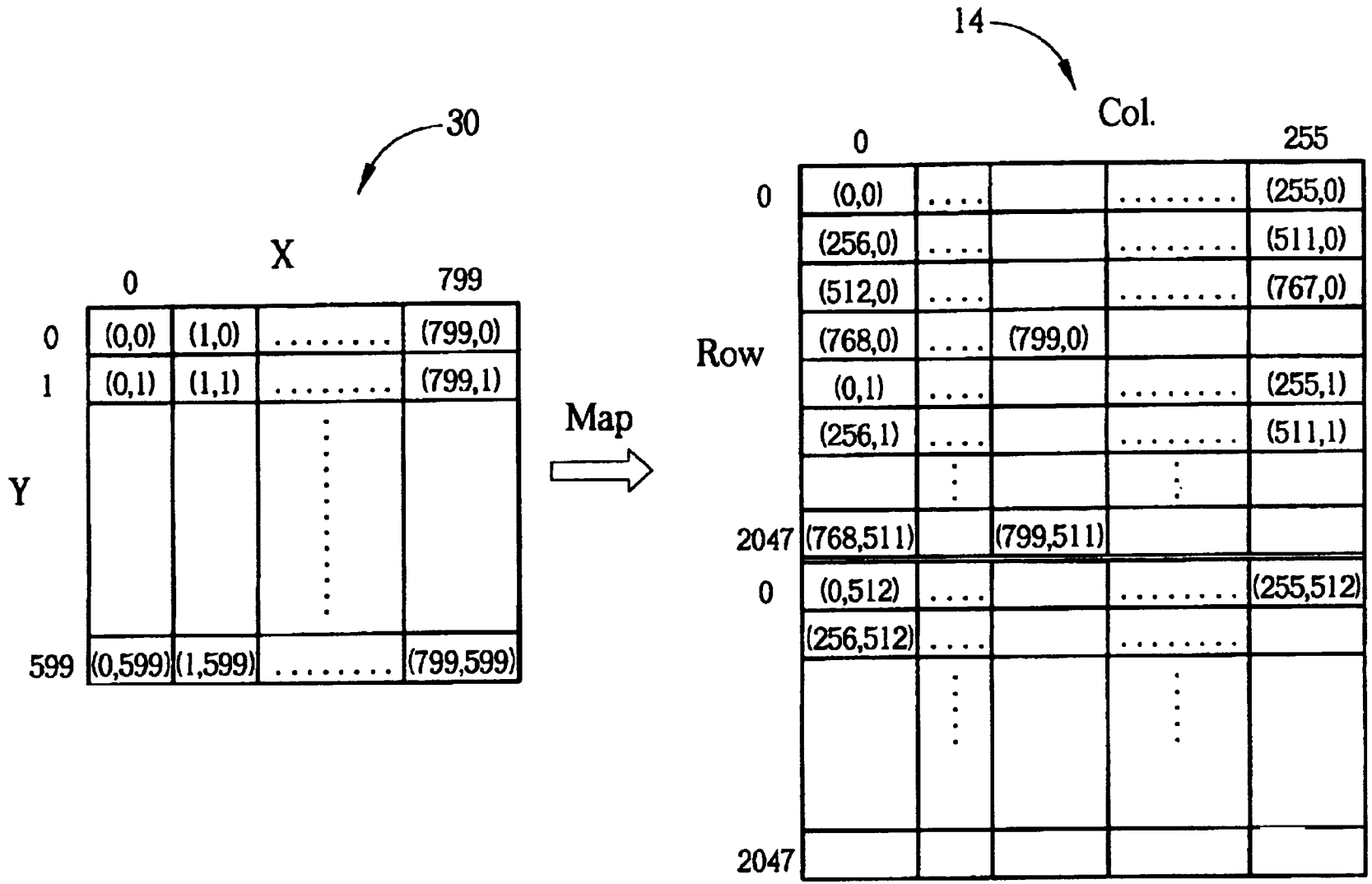
Fig. 2 Prior art
FIG. 2 is a layout map relation diagram of a display and an image memory shown in FIG. 1.
Figure 3:
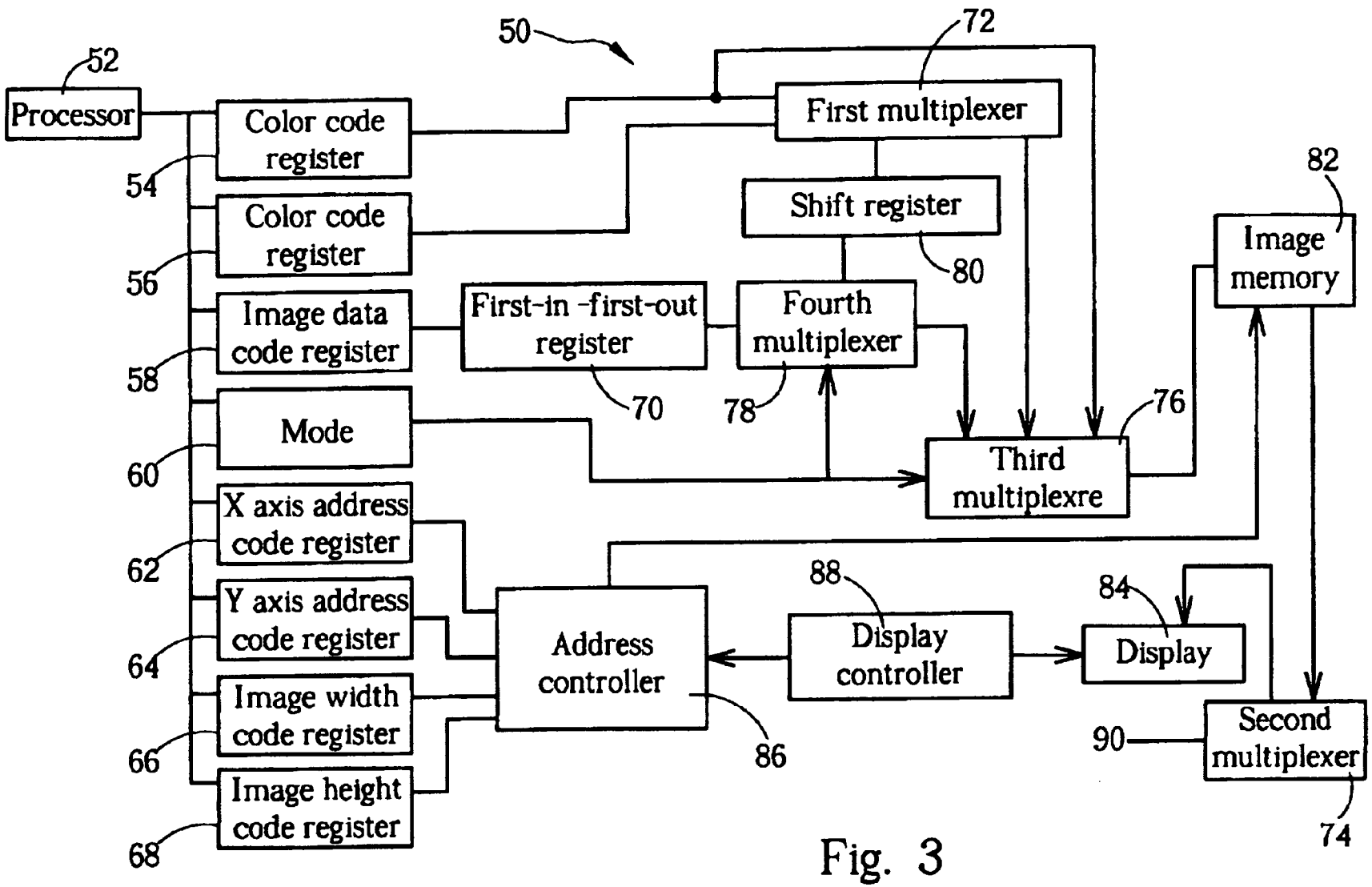
FIG. 3 is a diagram of the present invention image data processing system.

Please refer to FIG. 3. FIG. 3 is a diagram of a present invention image data processing system 50. The image data processing system 50 has a processor 52, two color code registers 54, 56, an image data code register 58, electrically connected to the processor 52, a mode selector 60, an X-axis address code register 62, a Y-axis address code register 64, an image width code register 66, an image height code register 68, a first-in-first-out register 70, a first multiplexer 72, a second multiplexer 74, a third multiplexer 76, a fourth multiplexer 78, a shift register 80, an image memory 82, a display 84, an address controller 86, and a display controller 88.

The image data processing system 50 can be set to three different drawing modes: single-bit map mode, 16-bit map mode, and block mode. Single-bit map mode divides an image area of an on screen display into foreground and background, and so the image area has only a foreground color and a background color. In 16-bit map mode, every pixel in an image area of the on screen display is respectively set by the processor 52. In block mode, an image area of the on screen display is a color square with a single color. An on screen display can comprise a plurality of image areas, and each image area can be drawn using a different drawing mode.

In the image data processing system 50, the processor 52 can store two different color codes into the color code registers 54 and 56, respectively, store the image data code into the image data code register 58, and store the mode code into mode selector 60. The processor 52 further stores the X-axis position, which the first pixel of an image area of the on screen display (OSD) displays onto the screen, into the X-axis address code register 62. The processor 52 also stores the Y-axis position into the Y-axis address code register 64, and stores the width and height of the image area of the screen into the image width code register 66 and the image height code register 68, respectively.

The first-in-first-out register 70 is electrically connected between the image data code register 58 and the fourth multiplexer 78 and is used to store the image data codes returned by the image data code register 58. The shift register 80 is electrically connected between the fourth multiplexer 78 and the first multiplexer 72 and is used to store the image data codes returned by the fourth multiplexer 78 and to shift out each bit in the image data code to the first multiplexer 72. The first multiplexer 72 is electrically connected between the color code registers 54, 56 and the third multiplexer 76, and selects a color code from the two color code registers 54, 56 according to the shift register 80, and outputs the selected color code to the third multiplexer 76. The third multiplexer 76 is electrically connected between the color code register 54, the first multiplexer 72, the fourth multiplexer 78, and the image memory 82. The third multiplexer 76 selects either the color code register 54, the output color code of the first multiplexer 72, or the image data code of the fourth multiplexer 78 according the output mode code of the mode selector 60. The fourth multiplexer 78 is electrically connected to the first-in-first-out register 70, the shift register 80, and the third multiplexer 76. The fourth multiplexer 78 outputs the image data code sent from the first-in-first-out register 70 to the shift register 80 or to the third multiplexer 76 according the output mode code of the mode selector 60. The image memory 82 is electrically connected to the output port of the third multiplexer 76 and is used to store the color code or the image data code outputted by the third multiplexer 76. The address controller 86 stores the output color code of the third multiplexer 76 into the predetermined address of the image memory 82 according to the data sent from the X-axis address code register 62, the Y-axis address code register 64, the image width code register 66, and the image height code register 68.

The display 84 is electrically connected to the output port of the second multiplexer 74, and may be a liquid crystal display (LCD) or a cathode-ray tube display. The display controller 88 is electrically connected between the address controller 86 and the display 84, and outputs the color code or the image data code stored in the image memory 82 to the display 84 via the second multiplexer 74 by way of the address controller 86. The display controller 88 controls the display 84 so that the display 84 can display a first image according to the color code or the image data code. This presents an on screen display (OSD), or the image area within the OSD.

The second multiplexer 74 has two input ports and an output port. The two input ports of the second multiplexer 74 are connected to the output port of the image memory 82 and an external image data code input port 90, respectively. The output port of the second multiplexer 74 is connected to the input port of the display 84. The external image data code input port 90 is used to input external image data so that the display 84 can display a second, externally driven image. The display controller 88 controls displaying of the first and second image by way of the second multiplexer 74 so that the first and second image are overlapped on the display 84.

When the image data processing system 50 is set to the single-bit map mode, the mode selector 60 will output a mode code representing single-bit map mode to the third multiplexer 76 and the fourth multiplexer 78. The processor 52 will store the color codes for the foreground and background colors into the color code registers 54 and 56, respectively, and store the image data code into the image data code register 58. Each color code and image data code has 16 bits.

When the first-in-first-out register 70 outputs the image data code, the image data code will be inputted into the shift register 80 via the fourth multiplexer, and the shift register 80 will shift out each bit of the image data code into the first multiplexer 72. When the bit of the shift register 80 input into the first multiplexer 72 is "1", the processor 52 will input the foreground color code stored in the color code register 54 into the image memory 82 via the first multiplexer 72 and the third multiplexer 76. When the bit from the shift register 80 inputted into the first multiplexer 72 is "0", the processor 52 will input the background color code stored in the color code register 56 into the image memory 82 via the first multiplexer 72 and the third multiplexer 76. The address controller 86 will store the color code output by the third multiplexer 76 into the predetermined address in the image memory according to the data returned by the X-axis address code register 62, the Y-axis address code register 64, the image width code register 66, and the image height code register 68.

After the address controller 86 stores a predetermined number of the color codes into the image memory 82, the address controller 86 will output the color code stored in the image memory 82 into the display 84 via the second multiplexer 74, and use the display controller 88 to control the display position of the plurality of color codes on the display 84 so that the display 84 will produce an image area on the on screen display (OSD) according the plurality of color codes.

After the processor 52 stores the foreground color and the background color into the color code registers 54 and 56, respectively, it no longer needs to access the color code registers 54 and 56. After the processor 52 stores a 16-bit image data code into the image data code register 58, it can select 16 pixels of color codes. When selecting 16 pixels of color codes, the processor 52 only outputs the data for the image data code register 58 once. For the processor 52, the speed of the image data processing is faster.

In the preferred embodiment, the image data processing system 50 further comprises two color code registers to store another two color codes, so the image data processing system 50 can be set to a two-bit map mode. Each image data code thus has two bits, which provides each image area in the on screen display (OSD) with four colors. In an analogous manner, the image data processing system 50 can be set to a three-bit map mode, a four-bit map mode, and so on by increasing the number of color code registers.

When the image data processing system 50 is set to 16-bit map mode, the mode selector 60 will output a mode code representing 16-bit map mode to the third multiplexer 76 and the fourth multiplexer 78. In this mode, every image data code also has 16 bits, and every image data code represents a color code. The processor 52 will store an image data code into the image data code register 58, output the image data code to the first-in-first-out register 70, and store the image data code into the image memory 82 through the fourth multiplexer 78 and the third multiplexer 76. The address controller 86 then stores the image data code into the predetermined address in the image memory 82 according to the data returned by the X-axis address code register 62, the Y-axis address code register 64, the image width code register 66, and the image height code register 68. Because each image data code is a color code, every image data code represents a single pixel of data. This drawing mode is similar to the drawing mode of the prior art image data processing system.

When the image data processing system 50 is set to block mode, the processor 52 will store a predetermined color code into the color code register 54, and the mode selector 60 will output a mode code representing block mode to the third multiplexer 76. The processor 52 then outputs the color code in the color code register 54 to the image memory 82 via the third multiplexer 76, and the address controller 86 will store the color code returned by the X-axis address code register 62, the Y-axis address code register 64, the image width code register 66, and the image height code register 68 into the predetermined address in the image memory 82.

After the processor 52 stores a predetermined color into the color code register 54, it no longer needs to access the color code register 54. The display 84 will display an entire image, which improves the speed of processing the image data.

In the contrast to the prior art image data processing system, the present invention image data processing system 50 provides different drawing modes. The processor 52 is thus able to reduce the amount of image data by selecting an appropriate mode to increase the image data processing speed. The image display of the present invention on screen display (OSD) is consequently more efficient.

Those skills in the art will readily observe that numerous modifications and alterations of the device may be made while retaining the teachings of the invention. Accordingly, the above disclosure should be construed as limited only by the mates and bounds of the appended claims.

What is claimed is:

1. An image data processing system comprising:

[2N] $2^N$ color code registers for storing a plurality of color codes;

a first multiplexer electrically connected to every output port of the [2N] $2^N$ color code registers, the first multiplexer comprising a control port for inputting an N-bit image code, the first multiplexer choosing one of the outputs of the M color code registers as output according to the N-bit image code;

a processor for storing [2N] $2^N$ color codes in the [2N] $2^N$ color code registers, and periodically transmitting a plurality of N-bit image codes to the control port of the first multiplexer so that the first multiplexer periodically chooses one of the color codes stored in the [2N] $2^N$ color code registers as output according to one of the N-bit image codes:

an image memory electrically connected to an output port of the first multiplexer for storing a plurality of color codes received from the first multiplexer;

an address controller electrically connected to both the processor and the image memory for storing the plurality of color codes received from the first multiplexer into a predetermined address of the image memory according to a command from the processor;

*a* display connected to an output port of the image memory; and a display controller electrically connected to both the display and the address controller for transmitting the plurality of color codes stored in the image memory to the display via the address controller, and for controlling operations of the display so that the display is able to show a first image according to the plurality of color codes.

2. The image data processing system of claim 1 wherein N is equal to 1, the image data processing system further comprising a shift register electrically connected to both the first multiplexer and the processor for storing a plurality of one-byte image codes received from the processor, and the shift register periodically transmitting the plurality of image codes to the control port of the first multiplexer so that the first multiplexer periodically chooses one of the color codes stored in the two color code registers as output according to one of the image codes.

3. The image data processing system of claim 1 wherein N is greater than 1, the image data processing system further comprising a first-in-first-out register electrically connected to both the first multiplexer and the processor for storing a plurality of N-bit image codes received from the processor, and the first-in-first-out register periodically transmitting the plurality of image codes to the control port of the first multiplexer so that the first multiplexer periodically transforms the plurality of image codes into a corresponding plurality of color codes.

4. The image data processing system of claim 1 wherein the display is a liquid crystal display (LCD).

5. The image data processing system of claim 1 further comprising a second multiplexer, wherein the second multiplexer comprises two input ports and an output port, the two input ports of the second multiplexer being electrically connected to the output port of the image memory and an external image input port, respectively, and the output port of the second multiplexer being electrically connected to the input port of the display, the external image input port being used to input external image data so that the display is able to show a second image, and the display controller controls displaying of the first image and the second image via the second multiplexer so that both the first image and the second image overlap when shown on the display.

6. The image data processing system of claim 1 further comprising a third multiplexer and a mode controller, wherein the third multiplexer comprises two input ports, an output port, and a control port, the two input ports of the third multiplexer electrically connected to the output port of the first multiplexer and an output part of a predetermined color code register from the plurality of color code registers, respectively, and the output port and control port of the third multiplexer being electrically connected to the input port of the image memory and the output port of the mode controller, respectively, the processor being able to store a color code in the predetermined color code register and a mode code in the mode controller, the third multiplexer choosing the output of the predetermined color code register according to the mode code so that the color code stored in the predetermined color [cods] *code* register is stored into a predetermined address of the image memory.

7. The image data processing system of claim 6 wherein the third multiplexer further comprises a third input port electrically connected to the processor, and the processor is able to store the plurality of color codes into the predetermined address of the image memory via the third input port of the third multiplexer.

8. An image data processing system comprising:

an image memory for storing a color code, an output port of the image memory being electrically connected to a display;

a processor for storing the color code in the image memory;

an address controller electrically connected to both the processor and the image memory for storing the color code in a plurality of addresses of the image memory according to the address information of an image area received from the processor, and the plurality of addresses of the image memory storing the color code corresponding to at least two pixels of the image area;

a display controller electrically connected to both the display and the address controller for transmitting the color code stored in the image memory to the display via the address controller, and controlling the operations of the display so that the display shows a first image according to the color code; and a [second] multiplexer comprising:

two input ports electrically connected to the output port of the image memory and an external image input port, respectively, the external image input port being used to input external image data so that the display is able to show a second image; and an output port electrically connected to the input port of the display, the display controller controlling the exhibitions of the first image and the second image via the [second] multiplexer so that both the first image and the second image overlap when shown on the display.

9. The image data processing system of claim 8 wherein the display is a liquid crystal display.

10. An image data processing system comprising:

[2N] $2^N$ color code registers for storing a plurality of color codes;

a first multiplexer electrically connected to every output port of the [2N] $2^N$ color code registers, the first multiplexer comprising a control port for inputting an N-bit image code, the first multiplexer choosing one of the outputs of the [2N] $2^N$ color code registers as output according to the N-bit image code;

a processor for storing [2N] $2^N$ color codes in the [2N] $2^N$ color code registers, and periodically transmitting a plurality of N-bit image codes to the control port of the first multiplexer so that the first multiplexer periodically chooses one of the color codes stored in the [2N] $2^N$ color code registers as output according to one of to N-bit image codes;

an image memory electrically connected to an output port of the first multiplexer for storing a plurality of color code received from the first multiplexer;

an address controller electrically connected to both the processor and the image memory for storing the plurality of color codes received from the first multiplexer into a predetermined address of the image memory according to a command from the processor; *and* a mode controller for storing a mode code from the processor; and a third multiplexer comprising two input ports, an output port, and a control port, the two input ports of the third multiplexer electrically connected to the output port of the first multiplexer and an output port of a predetermined color code register from the plurality of color code registers, respectively, and the output port and control port of the third multiplexer being electrically connected to the input port of the image memory and the output port of the mode controller, respectively the processor being able to store a color code in the predetermined color code register, the third multiplexer choosing the output of the predetermined color code register according to the mode code so that the color code stored in the predetermined color code register is stored into a predetermined address of the image memory.

11. The image data processing system of claim 10 wherein N is equal to 1, the image data processing system further comprising a shift register electrically connected to both the first multiplexer and the processor for storing a plurality of one-byte image codes received from the processor, and the shift register periodically transmitting the plurality of image codes to the control port of the first multiplexer so that the first multiplexer periodically chooses one of the color codes stored in the two color code registers as output according to one of the image codes.

12. The image data processing system of claim 10 wherein N is greater than 1, the image data processing system further comprising a first-in-first-out register electrically connected to both the first multiplexer and the processor for storing a plurality of N-bit image codes received from the processor, and the first-in-first-out register periodically transmitting the plurality of image codes to the control port of the first multiplexer so that the first multiplexer periodically transforms the plurality of image codes into a corresponding plurality of color codes.

13. The image data processing system of claim 10 wherein the output port of the image memory is electrically connected to a display, the image data processing system further comprising a display controller electrically connected to both the display and the address controller for transmitting the plurality of color codes stored in the image memory to the display via the address controller, and for controlling operations of the display so that the display is able to show a first image according the plurality of color codes.

14. The image data processing system of claim 13 wherein the display is a liquid crystal display (LCD).

15. The image data processing system of claim 13 further comprising a second multiplexer, wherein the second multiplexer comprises two input ports and an output port, the two input ports of the second multiplexer being electrically connected to the output port of the image memory and an external image input port, respectively, and the output port of the second multiplexer being electrically connected to the input port of the display, the external image input port being used to input external image data so that the display is able to show a second image, and the display controller controls displaying of the first image and the second image via the second multiplexer so that both the first image and the second image overlap when shown on the display.

16. The image data processing system of claim 10 wherein the third multiplexer further comprises a third input port electrically connected to the processor, and the processor is able to store the plurality of color codes into the predetermined address of the image memory via the third input port of the third multiplexer.

*17. An image data processing system, comprising:*

*an image memory configured to store a color code, wherein the image memory includes an output port coupled to a multiplexer, and wherein the image*

*memory is further configured to be coupled to a display via the multiplexer;*

*a processor configured to direct storage of the color code in the image memory;*

*an address controller configured to control storage of the color code at a plurality of addresses in the image memory;*

*a display controller coupled to the address controller and configured to be coupled to the display to allow the color code stored in the image memory to be transmitted to the display, so that the display shows a first image according to the stored color code; and*

*the multiplexer including:*

*a plurality of input ports coupled to the output port of the image memory and an external image input port, respectively, wherein the external image input port is configured to provide external image data so that the display shows a second image; and*

*an output port configured to be operably coupled to an input port of the display, wherein the display controller is further configured to control both the first image and the second image via the multiplexer so that both the first image and the second image overlap on the display.*

*18. The image data processing system of claim 17, wherein the address controller is further configured to control storage of the color code at a plurality of addresses in the image memory according to the address information of an image area, and wherein the plurality of addresses in the image memory correspond to at least two pixels of the image area.*

*19. The image data processing system of claim 17, wherein the display comprises a liquid crystal display (LCD).*

*20. A method, comprising:*

*selecting a drawing mode for a display;*

*providing an image code to a multiplexer such that the multiplexer chooses one or more color codes stored in one or more color code registers;*

*selecting the one or more color codes based, at least in part, on the selected drawing mode;*

*providing the selected one or more color codes to a display controller;*

*outputting image data based, at least in part, on the provided one or more color codes; and*

*storing the selected one or more color codes in an image memory using an address controller.*

*21. The method of claim 20, wherein the drawing mode comprises one of a single-bit map mode, a 16-bit map mode, or a block mode.*

*22. The method of claim 20, wherein said outputting image data further comprises:*

*retrieving the selected one or more color codes from a predetermined address in the image memory.*

*23. The method of claim 20, wherein the multiplexer is a first multiplexer, and wherein said outputting image data further comprises:*

*providing the image data to a second multiplexer such that the second multiplexer chooses from image data stored in the image memory or from external image data; and*

*selecting image data to be output to the display controller.*

* * * * *

UNITED STATES PATENT AND TRADEMARK OFFICE

CERTIFICATE OF CORRECTION

PATENT NO. : RE42,286 E
APPLICATION NO. : 11/450949
DATED : April 12, 2011
INVENTOR(S) : Chen et al.

It is certified that error appears in the above-identified patent and that said Letters Patent is hereby corrected as shown below:

Title page, item (75), under "Inventors", in Column 1, Line 3, delete "Hsinchu" and insert -- Hsin-Chu --.

Title page, item (22), under "Filed", in Column 1, Line 2, below "Jun. 8, 2006" insert -- (Under 37 CFR 1.47) --.

Title page, item (30), under "Foreign Application Priority Data", in Column 1, Line 1, delete "Jan. 9, 2000 (TW) ..... 89117914 A" and insert -- Sep. 1, 2000 (TW) ..... 89117914 A --.

Column 5, line 62, in Claim 1, delete "codes:" and insert -- codes; --.

Column 6, line 53, in Claim 6, delete "output part" and insert -- output port --.

Column 7, line 37, in Claim 9, delete "liquid crystal display." and insert -- liquid crystal display (LCD). --.

Column 7, line 53, in Claim 10, delete "to one of to" and insert -- to one of the --.

Column 8, line 6, in Claim 10, delete "respectively" and insert -- respectively, --.

Column 8, line 41, in Claim 13, delete "according the" and insert -- according to the --.

Signed and Sealed this
Thirteenth Day of September, 2011

David J. Kappos

David J. Kappos
*Director of the United States Patent and Trademark Office*